(12) United States Patent
Chen et al.

(10) Patent No.: US 9,315,421 B2
(45) Date of Patent: Apr. 19, 2016

(54) ENVIRONMENT-FRIENDLY NATURAL-LIKE ARTIFICIAL STONE CONTAINING FLY ASH AND THE METHOD FOR PRODUCING THE ARTIFICIAL STONE

(75) Inventors: Guomai Chen, Shanghai (CN); Malhua Chen, Shanghai (CN); Yi Xia, Pudong New Area (CN); Jiye You, Pudong New Area (CN); Rendao Zhou, Pudong New Area (CN); Liang Zeng, Pudong New Area (CN)

(73) Assignee: SHANGHAI APE STONE CO., LTD, Shanghai (CN)

( * ) Notice: Subject to any disclaimer, the term of this patent is extended or adjusted under 35 U.S.C. 154(b) by 172 days.

(21) Appl. No.: 14/119,353

(22) PCT Filed: Dec. 26, 2011

(86) PCT No.: PCT/CN2011/002188
§ 371 (c)(1),
(2), (4) Date: Jul. 7, 2014

(87) PCT Pub. No.: WO2013/063732
PCT Pub. Date: May 10, 2013

(65) Prior Publication Data
US 2015/0118484 A1  Apr. 30, 2015

(30) Foreign Application Priority Data

Nov. 2, 2011  (CN) .......................... 2011 1 0341137

(51) Int. Cl.
| | |
|---|---|
| *C04B 28/04* | (2006.01) |
| *B28B 1/00* | (2006.01) |
| *B28B 1/08* | (2006.01) |
| *C04B 28/06* | (2006.01) |
| *C04B 41/70* | (2006.01) |
| *C04B 28/14* | (2006.01) |
| *C04B 111/20* | (2006.01) |
| *C04B 111/52* | (2006.01) |
| *C04B 111/54* | (2006.01) |
| *C04B 111/00* | (2006.01) |

(52) U.S. Cl.
CPC ................. *C04B 28/04* (2013.01); *B28B 1/008* (2013.01); *B28B 1/08* (2013.01); *C04B 28/06* (2013.01); *C04B 28/14* (2013.01); *C04B 41/70* (2013.01); *C04B 2111/00017* (2013.01); *C04B 2111/2038* (2013.01); *C04B 2111/52* (2013.01); *C04B 2111/542* (2013.01); *Y02W 30/92* (2015.05); *Y02W 30/94* (2015.05); *Y10T 428/26* (2015.01)

(58) Field of Classification Search
None
See application file for complete search history.

(56) References Cited

U.S. PATENT DOCUMENTS 5,266,111 A * 11/1993 Barbour .................... C04B 7/26
106/707

FOREIGN PATENT DOCUMENTS

| | | | |
|---|---|---|---|
| CN | 101492273 A | | 7/2009 |
| CN | 101614010 A | | 12/2009 |
| CN | 101774224 | | 7/2010 |
| CN | 101705026 B | * | 6/2011 |
| CN | 103570313 A | * | 2/2014 |
| WO | WO 2009/136518 | | 11/2009 |

\* cited by examiner

*Primary Examiner* — David Sample
(74) *Attorney, Agent, or Firm* — Myron Greenspan Lackenbach Siegel, LLP

(57) ABSTRACT

The present invention provides an environment-friendly natural-like artificial stone containing fly ash. A formulation and a method of producing the artificial stone is compared with the existing artificial stone. The artificial stone produced by the present invention has characteristics of higher long-term strength and density, excellent weather resistance and corrosion resistance, and also of thermal insulation and sound insulation, in some degree. It has very strong durability and color stability under a variety of adverse weather conditions, without efflorescence and coming off, and with hardly any color change.

13 Claims, No Drawings

ENVIRONMENT-FRIENDLY NATURAL-LIKE ARTIFICIAL STONE CONTAINING FLY ASH AND THE METHOD FOR PRODUCING THE ARTIFICIAL STONE

BACKGROUND OF THE INVENTION

1. Field of the Invention

The present invention relates to a building material, in particular to an environment-friendly natural-like artificial stone containing fly ash and the method of producing the same.

2. Description of the Prior Art

Fly ash, which is fine ash collected in flue gas after coal combustion, is a waste by-product largely emitted by enterprises using coal, such as thermal power plants and major solid waste emitted by enterprises using coal, such as coal-fired power plants. Sizes of the thermal power plants and other coal using enterprises around the world produce large amounts of fly ash every year.

China is a country mining and a large consumer of coal, and coal is the basic fuel for electricity production in China. Fly ash is one of the larger industrial waste materials currently discharged in China. In recent years, with the development of the power industry, the emissions of fly ash from coal-fired power plants increases year by year, and had reached 300 million tons in 2010. If the fly ash can't be commercialized and utilized, it can be converted into dust to pollute the air and cause blockages or obstructions if the fly ash is emitted into rivers resulting in toxic chemicals that can harm human and other living things. Because without any previous method of treatment and use fly ash becomes the industrial waste and pollutes the environment, therefore causes serious environmental harm, and also becomes a heavy burden to the enterprises generating by fly ash. The fly ash has caused enormous pressure on China's national economy and ecological environment. Making the fly ash recyclable and profitable, which is beneficial and reduces the burden of enterprises and environmental pollution, and benefits society generally, has become a concern and is being addressed by all sectors of society.

Enormous pressures from global energy demands and environmental pollution strongly stimulates the research and development of fly ash utilization. The fly ash has become the striking new building material and chemical material with resource-rich, low cost, useful-innocuous in the international market for such materials.

The utilization of fly ash is still at an exploratory phase in the artificial stone field. There are many problems resulting from large differences in formulation, poor stability of product quality and so on. Therefore, there is a need to do more research for reasonable formulation, product quality and stability, in order to meet the market demand, and also in order to provide a new method and means of reutilization of fly ash.

SUMMARY OF THE INVENTION

The present invention provides a formulation of an artificial stone containing fly ash, an artificial stone produced by using the formulation, and its production method. The artificial stone containing fly ash, formulation and production method according to the invention process the scientific components and formulation that improve the long-term strength, alkali burnout resistance and corrosion resistance of the product, and reduce water absorption.

The first aspect of the present invention relates to a formulation for an environment-friendly natural-like artificial stone containing fly ash, the components of the formulation include:

| | |
|---|---|
| cement | 30~70 parts by weight; |
| fly ash | 10~70 parts by weight; |
| quicklime | 2~25 parts by weight; |
| microsilica | 5~10 parts by weight; |
| grit | 20~50 parts by weight; |
| ceramic | 0~50 parts by weight; |
| plasticizer | 1~4 parts by weight; |
| cellulose ether | 0.01~0.5 parts by weight; |
| starch ether | 0.01~0.5 parts by weight; |
| lignocellulose | 0.1~0.5 parts by weight; |
| $(HOCH_2CH_2)_n NH_{3-n}$ | 0.01~0.5 parts by weight; | wherein n is an integer from 1 to 3.

It should be understood that, in the above components of the formulation of the present invention, any one or a mixture of more than one of the following can be added: rheological agent, defoamer, surfactant, other thickener, and adhesive.

The second aspect of the present invention relates to an environment-friendly natural-like artificial stone containing fly ash produced using the above components of the formulation. The formulation for the artificial stone includes:

| | |
|---|---|
| cement | 30~70 parts by weight; |
| fly ash | 10~70 parts by weight; |
| quicklime | 2~25 parts by weight; |
| microsilica | 5~10 parts by weight; |
| grit | 20~50 parts by weight; |
| ceramic | 0~50 parts by weight; |
| plasticizer | 1~4 parts by weight; |
| cellulose ether | 0.01~0.5 parts by weight; |
| starch ether | 0.01~0.5 parts by weight; |
| lignocellulose | 0.1~0.5 parts by weight; |
| $(HOCH_2CH_2)_n NH_{3-n}$ | 0.01~0.5 parts by weight; | wherein n is an integer from 1 to 3.

In the artificial stone of the present invention, the formulation also can include pigment. The formulation can also include a coupling agent. The pigment can be coated on the outer surface of the artificial stone, or be mixed with other components to produce the artificial stone.

According to a preferred embodiment of the artificial stone of the present invention, the artificial stone includes a structural matrix, an outside layer coated on the outer surface of the structural matrix, and a color layer coated on the outer surface of the outside layer, wherein:

The formulation for the structural matrix includes:

| | |
|---|---|
| cement | 30~70 parts by weight; |
| fly ash | 10~70 parts by weight; |
| quicklime | 2~25 parts by weight; |
| microsilica | 5~10 parts by weight; |
| grit | 20~50 parts by weight; |
| ceramic | 0~50 parts by weight; |
| plasticizer | 1~4 parts by weight; |
| cellulose ether | 0.01~0.5 parts by weight; |
| starch ether | 0.01~0.5 parts by weight; |
| lignocellulose | 0.1~0.5 parts by weight; |
| $(HOCH_2CH_2)_n NH_{3-n}$ | 0.01~0.5 parts by weight; | wherein n is an integer from 1 to 3.

The formulation for the outside layer includes:

| | |
|---|---|
| cement | 30~70 parts by weight; |
| fly ash | 10~70 parts by weight; |
| hemiliydrate gypsum | 0~10 parts by weight; |
| quicklime | 2~25 parts by weight; |
| microsilica | 5~10 parts by weight; |
| calcined metakaolin | 0~10 parts by weight; |
| grit | 20~50 parts by weight; |
| ceramic | 0~50 parts by weight; |
| plasticizer | 1~4 parts by weight; |
| cellulose ether | 0.01~0.5 parts by weight; |
| starch ether | 0.01~0.5 parts by weight; |
| latex powder | 2~15 parts by weight; |
| lignocellulose | 0.1~0.5 parts by weight; |
| $(HOCH_2CH_2)_m NH_{3-m}$ | 0.01~0.5 parts by weight; |
| Coupling agents | 0~0.5 parts by weight; |

Wherein n and m are integers from 1 to 3. And n and m can be the same or different.

Similarly, in the various components of the artificial stone described by the present invention, one or more mixtures of rheological agent, defoamer, surfactant, other thickener, and adhesive can be added.

The thickness of the outside layer of the artificial stone is preferably 0.1~5 mm, and more preferably is 1~3 mm.

The third aspect of the present invention relates to a method for producing the artificial stone. The method includes the following steps:

Step 1, preparing a slurry of color layer, the slurry of the outside layer, and the slurry of the structural matrix;

The formulation for the structural matrix includes:

| | |
|---|---|
| cement | 30~70 parts by weight; |
| fly ash | 10~70 parts by weight; |
| quicklime | 2~25 parts by weight; |
| microsilica | 5~10 parts by weight; |
| grit | 20~50 parts by weight; |
| ceramic | 0~50 parts by weight; |
| plasticizer | 1~4 parts by weight; |
| cellulose ether | 0.01~0.5 parts by weight; |
| starch ether | 0.01~0.5 parts by weight; |
| lignocellulose | 0.1~0.5 parts by weight; |
| $(HOCH_2CH_2)_n NH_{3-n}$ | 0.01~0.5 parts by weight; | wherein n is an integer from 1 to 3.

The formulation for the outside layer includes:

| | |
|---|---|
| cement | 30~70 parts by weight; |
| fly ash | 10~70 parts by weight; |
| hemihydrate gypsum | 0~10 parts by weight; |
| quicklime | 2~25 parts by weight; |
| microsilica | 5~10 parts by weight; |
| calcined metakaolin | 0~10 parts by weight; |
| grit | 20~50 parts by weight; |
| ceramic | 0~50 parts by weight; |
| plasticizer | 1~4 parts by weight; |
| cellulose ether | 0.01~0.5 parts by weight; |
| starch ether | 0.01~0.5 parts by weight; |
| latex powder | 2~15 parts by weight; |
| lignocellulose | 0.1~0.5 parts by weight; |
| $(HOCH_2CH_2)_m NH_{3-m}$ | 0.01~0.5 parts by weight; |
| coupling agent | 0~0.5 parts by weight; |

Wherein n and m are integers from 1 to 3. And n and m can be the same or different;

Step 2, coating the prepared slurry of the color layer on the inside surface of the mold, to form the color layer.

Step 3, coating the prepared slurry of the outside layer on the surface of the color layer in the mold; the coating thickness of the slurry of the outside layer is preferably 0.1~5 mm, and more preferably 1~3 mm;

Step 4, pouring the prepared slurry of the structural matrix into the mold, and vibrating the molding.

To obtain better stability of production, the method for producing artificial stone of the present invention can also include:

Step 5, steam-curing the production vibration-molded in the step 4 at the temperature of 50~90° C.

Furthermore, the method for producing artificial stone of the present invention can include:

Step 6, re-steam-curing the production obtained in the step 5, at the temperature of 35~65° C.

Similarly, in the formulation described in the production method of the present invention, any one or a mixture of more than one of the following can be added: rheological agent, defoamer, surfactant, other thickeners, adhesive.

In the above content of the present invention, the cement can include any one or more mixture of portland cement and aluminate cement. Preferably, the cement of the present invention includes:

| | |
|---|---|
| portland cement | 35~50 parts by weight; |
| aluminate cement | 0~20 parts by weight; |

In the above content of the present invention, the fly ash can be any one or more mixture of low-calcium fly ash (F class), high calcium fly ash (C class) or a composite fly ash.

In the above content of the present invention, the re-dispersible latex powder (or re-dispersible emulsion latex powder) can be one or more mixture of vinyl acetate homopolymer or copolymer re-dispersible latex powder, vinyl laurate copolymer re-dispersible latex powder, acrylic acid or acrylic ester homopolymer or copolymer re-dispersible latex powder, organosilicon acrylic re-dispersible powder, styrene/butadiene copolymer re-dispersible latex powder, etc, or emulsion contained the same active ingredient proportion of these above substances. Such as a mixture contain 3~6 parts by weight of acrylic acid re-dispersible latex powder and/or 3~6 parts by weight of organosilicon acrylic re-dispersible latex powder.

In the above content of the present invention, the plasticizer (also known as plasticizers) is preferably polycarboxylic high-performance superplasticizer. The synthesized monomer of the polycarboxylic high-performance superplasticizer can be the polyoxyalkylene monomer containing polyoxyethylene group or polyoxypropylene group etc., methacrylic acid, acrylic acid, maleic acid (or maleic anhydride), (meth) allyl sulfonic acid, styrene sulfonic acid 2-acrylamido-2-methyl-propanesulfonic acid, the salts, esters or other derivatives of the above acid, such as (meth)allyl alcohol, (meth)acrylamide and so on. Also it can be sulfonated melamine-formaldehyde condensates, sulfonated naphthalene-formaldehyde condensate, modified ligninsulfonate salt, etc.

In the above content of the present invention, the pigment can be selected from various pigments been used in the technical field, such as carbon black, iron oxide, cobalt oxide, titanium dioxide, Pigment Red 122 (the main component is 2,9-dimethyl quinacridone), organic light yellow, phthalocyanine blue, malachite green, lemon yellow, copper sulfate, acrylic paint and so on, sold in the market.

In the above content of the present invention, the coupling agent can be organic chromium complexes, silane, titanate esters or aluminic acid compounds, etc.

In the above content of the present invention, the rheological agent (or rheology modifiers) can be polyurethane rheological agent or polyacrylic acid rheological agent.

In the above content of the present invention, the defoamer can be: 1) natural oil, such as soybean oil, corn oil; 2) polyether defoamer, such as GP, GPE, and GPES defoamer; 3) higher alcohol, such as the higher alcohols containing C12~C22; 4) silicon antifoaming agent, such as dimethyl silicon oil, polysiloxane; 5) polyether modified silicon defoamer and so on.

In the above content of the present invention, the thickener can be cellulose, polyacrylate, bentonite, associative polyurethanes, such as methyl cellulose, carboxyalkyl cellulose, hydroxyalkyl cellulose, homopolymers or copolymers of (meth)acrylic acid or its ester or salt, and so on.

The artificial stone containing fly ash produced by the present invention possesses a very high density and strength, excellent weather resistance and corrosion resistance, and also provides thermal insulation and sound insulation in some degree. It posses very strong durability and color stability in a variety of adverse weather conditions, without efflorescence and coming off, and with hardly changing color.

DETAILED DESCRIPTION OF THE INVENTION

The present invention provides an environment-friendly artificial stone containing fly ash, a formulation and a method of producing the artificial stone. The components of the formulation conclude:

| | |
|---|---|
| cement | 30~70 parts by weight; |
| fly ash | 10~70 parts by weight; |
| hemihydrate gypsum | 0~10 parts by weight; |
| quicklime | 2~25 parts by weight; |
| microsilica | 5~10 parts by weight; |
| calcined metakaolin | 0~10 parts by weight; |
| grit | 20~50 parts by weight; |
| ceramic | 0~50 parts by weight; |
| plasticizer | 1~4 parts by weight; |
| cellulose ether | 0.01~0.5 parts by weight; |
| starch ether | 0.01~0.5 parts by weight; |
| latex powder | 2~15 parts by weight; |
| lignocellulose | 0.1~0,5 parts by weight; |
| $(HOCH_2CH_2)_nNH_{3-n}$ | 0.01~0.5 parts by weight; | wherein n is an integer from 1 to 3.

The components of the formulation of the present invention can include a coupling agent and a pigment; and can also include one or a mixture of more than one of the following can be added: rheological agent, defoamer, surfactant, other thickener, and adhesive.

The following are examples of specific embodiments of the invention described in detail and are specific to enable a better understanding of the present invention:

EXAMPLE 1

One method includes the following steps:

Step 1, using a mold, which is made form natural or pre-processed stone according to market or customer needs. The slurries of the surface color layer, the slurry of the outside layer, and the slurry of the structural matrix are prepared. Wherein, the formulation for the slurry of the outside layer includes:

| | |
|---|---|
| white portland cement | 40 parts by weight; |
| white aluminate cement | 4 parts by weight; |
| fly ash | 15 parts by weight; |
| hemihydrate gypsum | 2 parts by weight; |
| quicklime | 1 parts by weight; |
| microsilica | 4 parts by weight; |
| calcined metakaolin | 5 parts by weight; |
| grit | 20 parts by weight; |
| polycarboxylic high-performance superplasticizer | 0.8 parts by weight; |
| cellulose ether | 0.02 parts by weight; |
| starch ether | 0.01 parts by weight; |
| acrylic acid redispersible latex powder | 3 parts by weight; |
| lignocellulose | 0.2 parts by weight; |
| diethanol amine | 0.01 parts by weight; |
| coupling agent | 0.05 parts by weight. |

The formulation for the slurry of the structural matrix includes:

| | |
|---|---|
| portland cement | 40 parts by weight; |
| fly ash | 60 parts by weight; |
| quicklime | 5 parts by weight; |
| microsilica | 4 parts by weight; |
| grit | 30 parts by weight; |
| ceramic | 30 parts by weight; |
| polycarboxylic high-performance superplasticizer | 1 parts by weight; |
| cellulose ether | 0.04 parts by weight; |
| starch ether | 0.04 parts by weight; |
| lignocellulose | 0.2 parts by weight; |
| diethanol amine | 0.01 parts by weight; |

Step 2, for coloring, spraying the several prepared slurries of the surface color layer on the inside surface of the mold, according to the scheduled proportion and position, to form the first surface color layer.

Step 3, after coloring, spraying the slurry of the second outside layer on the surface of the first surface color layer uniformly. The thickness of the slurry sprayed of the outside layer is controlled in the range of 1 to 3 mm, according to the differences of the thickness and the undulating shape of the production.

Step 4, after spraying the slurry of the outside layer, pouring the slurry of the structural matrix into the mold, and vibration-molding, to make the first surface color paste and the slurry of the second outside layer penetrate and fuse mutually. After drying, the fly ash artificial stone is obtained.

Step 5, steam-curing at the higher temperature of 50~90° C., and then demoulding. Re-steam-curing at the intermediate temperature of 50~90° C., and then drying.

EXAMPLE 2

Another method includes the following steps:

Step 1, using a mold, which is made from natural or pre-processed stone according to market or customer needs. The slurries of the surface color layer, the slurry of the outside layer, and the slurry of the structural matrix are prepared. Wherein, the formulation for the slurry of the outside layer concludes:

| | |
|---|---|
| white portland cement | 40 parts by weight; |
| white aluminate cement | 5 parts by weight; |
| fly ash | 10 parts by weight; |
| hemihydrate gypsum | 2 parts by weight; |
| quicklime | 1 parts by weight; |
| microsilica | 6 parts by weight; |
| calcined metakaolin | 5 parts by weight; |
| grit | 40 parts by weight; |
| polycarboxylic high-performance superplasticizer | 0.7 parts by weight; |
| cellulose ether | 0.02 parts by weight; |

-continued

| | |
|---|---|
| starch ether | 0.02 parts by weight; |
| acrylic acid redispersible latex powder | 5 parts by weight; |
| lignocellulose | 0.3 parts by weight; |
| diethanol amine | 0.04 parts by weight; |
| coupling agent | 0.05 parts by weight. |

The formulation for the slurry of the structural matrix concludes:

| | |
|---|---|
| portland cement | 30 parts by weight; |
| fly ash | 70 parts by weight; |
| quicklime | 5 parts by weight; |
| microsilica | 8 parts by weight; |
| grit | 20 parts by weight; |
| ceramic | 30 parts by weight |
| polycarboxylic high-performance superplasticizer | 1 parts by weight; |
| cellulose ether | 0.04 parts by weight; |
| starch ether | 0.02 parts by weight; |
| lignocellulose | 0.2 parts by weight; |
| diethanol amine | 0.03 parts by weight; |

Step 2, for coloring, spraying the several prepared slurries of the surface color layer on the inside surface of the mold, according to the scheduled proportion and position, to form the first surface color layer.

Step 3, after coloring, spraying the slurry of the second outside layer on the surface of the first surface color layer uniformly. The thickness of the slurry of the outside layer is controlled in range of 1 to 3 mm, according to the differences of the thickness and the undulating shape of the production.

Step 4, after spraying the slurry of the outside layer, pouring the slurry of the structural matrix into the mold, and vibration-molding, to make the first surface color paste and the base of the second outside layer penetrate and fuse mutually. After drying, the fly ash artificial stone is obtained.

Step 5, steam-curing at the higher temperature of 50~90° C., and then demoulding. Re-steam-curing at the intermediate temperature of 50~90° C., and then drying.

EXAMPLE 3

A third method includes the following steps:

Step 1, using a mold, which is made form natural or pre-processed stone according to market and customer needs. The slurries of the surface color layer, the slurry of the outside layer, and the slurry of the structural matrix are prepared. Wherein, the formulation for the outside layer paste concludes:

| | |
|---|---|
| white portland cement | 40 parts by weight; |
| fly ash | 20 parts by weight; |
| quicklime | 1 parts by weight; |
| microsilica | 6 parts by weight; |
| calcined metakaolin | 5 parts by weight; |
| grit | 40 parts by weight; |
| polycarboxylic high-performance superplasticizer | 0.7 parts by weight; |
| cellulose ether | 0.02 parts by weight; |
| starch ether | 0.02 parts by weight; |
| acrylic acid redispersible latex powder | 4 parts by weight; |
| lignocellulose | 0.2 parts by weight; |
| diethanol amine | 0.03 parts by weight; |
| coupling agent | 0.05 parts by weight. |

The formulation for the structural matrix concludes:

| | |
|---|---|
| portland cement | 50 parts by weight; |
| fly ash | 50 parts by weight; |
| quicklime | 3 parts by weight; |
| microsilica | 8 parts by weight; |
| grit | 30 parts by weight; |
| ceramic | 40 parts by weight |
| polycarboxylic high-performance superplasticizer | 1 parts by weight; |
| cellulose ether | 0.04 parts by weight; |
| starch ether | 0.04 parts by weight; |
| lignocellulose | 0.2 parts by weight; |
| diethanol amine | 0.02 parts by weight; |

Step 2, for coloring, spraying the several prepared slurries of the surface color layer on the inside surface of the mold, according to the scheduled proportion and position, to form the first surface color layer.

Step 3, after coloring, spraying the slurry of the second outside layer on the surface of the first surface color layer uniformly. The thickness of the slurry of the outside layer is controlled in range of 1 to 3 mm, according to the differences of the thickness and the undulating shape of the production.

Step 4, after spraying the slurry of the outside layer, pouring the slurry of the structural matrix into the mold, and vibration-molding, to make the first surface color paste and the base of the second outside layer penetrate and fuse mutually. After drying, the fly ash artificial stone is obtained.

Step 5, steam-curing at the higher temperature of 50~90° C., and then demoulding. Re-stream-curing at the intermediate temperature of 50~90° C., and then drying.

EXAMPLE 4

A fourth method includes the following steps:

Step 1, using a mold, which is made from natural or pre-processed stone model according to market and customer needs. The slurries of the surface color layer, the slurry of the outside layer, and the slurry of the structural matrix are prepared. Wherein, the formulation for the outside layer paste concludes:

| | |
|---|---|
| white portland cement | 40 parts by weight; |
| fly ash | 15 parts by weight; |
| quicklime | 2 parts by weight; |
| microsilica | 5 parts by weight; |
| grit | 20 parts by weight; |
| polycarboxylic high-performance superplasticizer | 0.6 parts by weight; |
| cellulose ether | 0.01 parts by weight; |
| starch ether | 0.01 parts by weight; |
| acrylic acid redispersible latex powder | 3 parts by weight; |
| lignocellulose | 0.2 parts by weight; |
| diethanol amine | 0.01 parts by weight; |
| coupling agent | 0.05 parts by weight. |

The formulation for the structural matrix concludes:

| | |
|---|---|
| portland cement | 50 parts by weight; |
| fly ash | 50 parts by weight; |
| quicklime | 3 parts by weight; |
| microsilica | 8 parts by weight; |
| grit | 30 parts by weight; |
| ceramic | 40 parts by weight |
| polycarboxylic high-performance superplasticizer | 1 parts by weight; |
| cellulose ether | 0.04 parts by weight; |

-continued

| | |
|---|---|
| acrylic acid redispersible latex powder | 2 parts by weight; |
| lignocellulose | 0.2 parts by weight; |
| diethano lamine | 0.01 parts by weight; |

Step 2, for coloring, spraying the several prepared slurries of the surface color layer on the inside surface of the mold, according to the scheduled proportion and position, to form the first surface color layer.

Step 3, after coloring, spraying the slurry of the second outside layer on the surface of the first surface color layer uniformly. The thickness of the slurry of the outside layer is controlled in range of 1 to 3 mm, according to the differences of the thickness and the undulating shape of the production.

Step 4, after spraying the slurry of the outside layer, pouring the slurry of the structural matrix into the mold, and vibration-molding, to make the first surface color paste and the base of the second outside layer penetrate and fuse mutually. After drying, the fly ash artificial stone is obtained.

Step 5, steam-curing at the higher temperature of 50~90° C., and then demoulding. Re-steam-curing at the intermediate temperature of 50~90° C., and then drying.

The artificial stone produced by the above examples of the present invention, compared with the existing artificial stone, posses the proprieties of higher long-term strength and density, excellent weather resistance and corrosion resistance, and also thermal insulation and sound insulation in some degree, very strong durability and color stability in a variety of adverse weather conditions, without efflorescence and falling off, and with hardly changing color.

Table 1, comparison of physical properties of the artificial stone made in accordance with the methods of above examples in accordance with the present invention and commercially available artificial stone.

| Test items | Purchased | Example 1 | Example 2 | Example 3 | Example 4 |
|---|---|---|---|---|---|
| Water absorption | 11.6% | 5.5% | 5.3% | 5.4% | 5.8% |
| Compressive strength after 28 days | 15 MPa | 25 MPa | 27 MPa | 21 MPa | 23 MPa |
| Compressive strength after 90 days | 18 MPa | 29 MPa | 31 MPa | 25 MPa | 27 MPa |
| Flexural strength after 28 days | 3.5 MPa | 6.0 MPa | 6.5 MPa | 6.1 MPa | 6.2 MPa |
| Flexural strength after 90 days | 4.1 MPa | 7.0 MPa | 7.3 MPa | 7.1 MPa | 7.1 MPa |
| Frost resistance | efflorescence after 10 cycles of freezing-thawing | 87% | 90% | 90% | 88% |
| Thermal conductivity | 0.64 W/m·K | 0.5 W/m·K | 0.48 W/m·K | 0.51 W/m·K | 0.48 W/m·K |
| Corrosion coefficient | 60% | 85% | 88% | 83% | 85% |
| Scrub resistance | not fade less 20 scrubs | not fade less 100 scrubs | not fade less 100 scrubs | not fade less 100 scrubs | not fade less 100 scrubs |

Wherein:

Testing the Water absorption was according to the standard GB/T 9966.3-2001 titled "Test methods for natural facing stones-Part 3: Test methods for bulk density, true density, true porosity and water absorption".

Testing the compressive strength and frost resistance was according to the standard GB/T 9966.1-2001 titled "Test methods for natural facing stones-Part 1: Dry, wet and after freezing test methods for compressive strength".

Testing the flexural strength was according to the standard GB/T 9966.2-2001 "Test methods for natural facing stones-Part 2: Dry, wet test method for flexural strength".

Testing the thermal conductivity and the heat-insulating property according to the standard GB/T 10294-1988 titled "Thermal insulation-Determination of steady-state thermal resistance and related properties—Guarded hot plate apparatus".

Testing the scrub resistance was according to the standard GB/T 9266-2009 titled "Determination of scrub resistance of film of architectural paints and coatings".

Testing the corrosion coefficient was according to the experimental anti-Sulfate in the standard GB/T 50082-2009 titled "Standard for test methods of long-term performance and durability of ordinary concrete".

In particular embodiments of the invention are described in detail, but its just as an example, the present invention is not limited to the embodiment described above. For the technicians in this field, the invention is equivalent to any modifications and alternatives are in the category of. Therefore, not from the spirit and scope of the equal transformation and modified, shall be covered in the scope of this invention.

The invention claimed is:

1. An artificial stone matrix containing fly ash, comprising:

| | |
|---|---|
| cement | 30-70 parts by weight; |
| fly ash | 10-70 parts by weight; |
| quicklime | 2-25 parts by weight; |
| microsilica | 5-10 parts by weight; |
| grit | 20-50 parts by weight; |

-continued

| | |
|---|---|
| ceramic | 0-50 parts by weight; |
| plasticizer | 1-4 parts by weight; |
| cellulose ether | 0.01-0.5 parts by weight; |

| | |
|---|---|
| starch ether | 0.01-0.5 parts by weight; |
| lignocellulose | 0.1-0.5 parts by weight; |
| $(HOCH_2CH_2)_n NH_{3-n}$ | 0.01-0.5 parts by weight; | wherein n is an integer from 1 to 3.

2. The artificial stone according to claim 1, further comprising an outside layer coated on the outer surface of the matrix, and a color layer coated on the outside surface of the outside layer.

3. The artificial stone according to claim 2, wherein the outside layer comprises:

| | |
|---|---|
| cement | 30-70 parts by weight; |
| fly ash | 10-70 parts by weight; |
| hemihydrate gypsum | 0-10 parts by weight; |
| quicklime | 2-25 parts by weight; |
| microsilica | 5-10 parts by weight; |
| calcined metakaolin | 0-10 parts by weight; |
| grit | 20-50 parts by weight; |
| ceramic | 0-50 parts by weight; |
| plasticizer | 1-4 parts by weight; |
| cellulose ether | 0.01-0.5 parts by weight; |
| starch ether | 0.01-0.5 parts by weight; |
| latex powder | 2-15 parts by weight; |
| lignocellulose | 0.1-0.5 parts by weight; |
| $(HOCH_2CH_2)_m NH_{3-m}$ | 0.01-0.5 parts by weight; |
| coupling agent | 0-0.5 parts by weight; | wherein m is an integer from 1 to 3.

4. The artificial stone according to claim 2, wherein said outside layer has a thickness selected from the range of 0.1-5 mm.

5. The artificial stone according to claim 1, wherein the cement is any one or a mixture of portland cement and aluminate cement.

6. The artificial stone according to claim 5, wherein the cement includes:

| | |
|---|---|
| portland cement | 35-50 parts by weight; |
| aluminate cement | 0-20 parts by weight. |

7. The artificial stone according to claim 2, wherein the matrix cement is any one or mixture of portland cement and aluminate cement.

8. The artificial stone according to claim 7, wherein the matrix cement includes:

| | |
|---|---|
| portland cement | 35-50 parts by weight; |
| aluminate cement | 0-20 parts by weight. |

9. A formulation for producing an artificial stone comprising:

| | |
|---|---|
| cement | 30-70 parts by weight; |
| fly ash | 10-70 parts by weight; |
| quicklime | 2-25 parts by weight; |
| microsilica | 5-10 parts by weight; |
| grit | 20-50 parts by weight; |
| ceramic | 0-50 parts by weight; |
| plasticizer | 1-4 parts by weight; |
| cellulose ether | 0.01-0.5 parts by weight; |
| starch ether | 0.01-0.5 parts by weight; |
| lignocellulose | 0.1-0.5 parts by weight; |
| $(HOCH_2CH_2)_n NH_{3-n}$ | 0.01-0.5 parts by weight; | wherein n is an integer from 1 to 3.

10. A method for producing an artificial stone comprising the following steps:

Step 1, preparing a slurry of a color layer, a slurry of an outside layer, and a slurry of a matrix;

the slurry of the matrix comprising:

| | |
|---|---|
| cement | 30-70 parts by weight; |
| fly ash | 10-70 parts by weight; |
| quicklime | 2-25 parts by weight; |
| microsilica | 5-10 parts by weight; |
| grit | 20-50 parts by weight; |
| ceramic | 0-50 parts by weight; |
| plasticizer | 1-4 parts by weight; |
| cellulose ether | 0.01-0.5 parts by weight; |
| starch ether | 0.01-0.5 parts by weight; |
| lignocellulose | 0.1-0.5 parts by weight; |
| $(HOCH_2CH_2)_n NH_{3-n}$ | 0.01-0.5 parts by weight; | wherein n is an integer from 1 to 3, the slurry of the outside layer comprising:

| | |
|---|---|
| cement | 30-70 parts by weight; |
| fly ash | 10-70 parts by weight; |
| hemihydrate gypsum | 0-10 parts by weight; |
| quicklime | 2-25 parts by weight; |
| microsilica | 5-10 parts by weight; |
| calcined metakaolin | 0-10 parts by weight; |
| grit | 20-50 parts by weight; |
| ceramic | 0-50 parts by weight; |
| plasticizer | 1-4 parts by weight; |
| cellulose ether | 0.01-0.5 parts by weight; |
| starch ether | 0.01-0.5 parts by weight; |
| latex powder | 2-15 parts by weight; |
| lignocellulose | 0.1-0.5 parts by weight; |
| $(HOCH_2CH_2)_m NH_{3-m}$ | 0.01-0.5 parts by weight; |
| coupling agent | 0-0.5 parts by weight; | wherein m is an integer from 1 to 3;

Step 2, coating the prepared slurry of the color layer on an inside surface of a mold, to form the color layer;

Step 3, coating the prepared slurry of the outside layer on a surface of the color layer in the mold; and Step 4, pouring the prepared slurry of the matrix into the mold, and vibrating the mold.

11. The method according to claim 10, wherein the coating thickness of the outside layer slurry is 0.1-5 mm.

12. The method according to claim 10, further comprising:
Step 5, steam-curing the molded product of step 4 at a temperature of 50-90° C.

13. The method according to claim 10, further comprising:
Step 6, re-steam-curing the product in the of step 5 at a temperature of 35-65° C.

* * * * *